(12) United States Patent
Cohen et al.

(10) Patent No.: US 7,949,573 B1
(45) Date of Patent: May 24, 2011

(54) DISPLAYING PRODUCT RECOMMENDATIONS IN ELECTRONIC COMMERCE

(75) Inventors: Jacob D. Cohen, Kirkland, WA (US); Werner G. Koepf, Bellevue, WA (US); Matthew R. Smith, Burien, WA (US)

(73) Assignee: Amazon Technologies, Inc., Reno, NV (US)

( * ) Notice: Subject to any disclaimer, the term of this patent is extended or adjusted under 35 U.S.C. 154(b) by 1191 days.

(21) Appl. No.: 11/612,397

(22) Filed: Dec. 18, 2006

(51) Int. Cl.
*G06Q 30/00* (2006.01)

(52) U.S. Cl. .................................. 705/26.7; 705/14.54

(58) Field of Classification Search ............... 705/26, 705/14.49, 14.53, 14.54, 14.66, 26.7, 26.8
See application file for complete search history.

(56) References Cited

U.S. PATENT DOCUMENTS

| | | | | |
|---|---|---|---|---|
| 5,774,868 | A * | 6/1998 | Cragun et al. | 705/10 |
| 5,790,426 | A * | 8/1998 | Robinson | 702/179 |
| 5,790,935 | A * | 8/1998 | Payton | 725/91 |
| 6,317,722 | B1 * | 11/2001 | Jacobi et al. | 705/14.51 |
| 6,853,982 | B2 * | 2/2005 | Smith et al. | 705/27 |
| 7,222,085 | B2 * | 5/2007 | Stack | 705/10 |
| 7,668,821 | B1 * | 2/2010 | Donsbach et al. | 705/27 |
| 7,693,887 | B2 * | 4/2010 | McLaughlin | 707/616 |
| 2003/0105682 | A1 * | 6/2003 | Dicker et al. | 705/27 |
| 2005/0193002 | A1 * | 9/2005 | Souders et al. | 707/103 X |
| 2006/0190348 | A1 * | 8/2006 | Ofer et al. | 705/26 |
| 2010/0328312 | A1 * | 12/2010 | Donaldson | 345/440 |

FOREIGN PATENT DOCUMENTS

| | | | |
|---|---|---|---|
| EP | 1484693 | A1 * | 12/2004 |
| WO | WO-0180133 | A2 * | 10/2001 |
| WO | WO-0219203 | A2 * | 3/2002 |

OTHER PUBLICATIONS

Power, C., "On-Line Banking: Amazon Founder: Web Firms Will Win Trusted-Advisor Role," American Banker, vol. 165, No. 126, p. 13, Jun. 30, 2000.*
Walker, L., "Shopping Sites Tell You More about Yourself," Newsbytes, Dec. 6, 2001.*
Anon., "Ekahau Enables Mobile Shopper Location for Metro AG Future Stores," Canada Newswire, May 19, 2003.*
Anon., "Happy 100% Mall-Free Holidays from ThisNext.com," PR Newswire, Nov. 20, 2006.*

* cited by examiner

*Primary Examiner* — Nicholas D Rosen
(74) *Attorney, Agent, or Firm* — Christensen O'Connor Johnson Kindness PLLC

(57) ABSTRACT

A system for presenting a set of recommended items corresponding to a first item is presented. The system comprises a processor, a memory; and a computer executable component. The computer executable component executes on the system, via the processor, and is configured to perform the following. An indication is received requesting the display of recommended items corresponding to the first item. A set of recommended items corresponding to the first item is then obtained. Display information is generated for displaying a list of items and the corresponding set of recommended items. The list of items includes the first item. Additionally, display information is provided, the display information for displaying the list of items and the corresponding set of recommended items on a consumer device.

37 Claims, 17 Drawing Sheets

DISPLAYING PRODUCT RECOMMENDATIONS IN ELECTRONIC COMMERCE

BACKGROUND

Electronic commerce is an increasingly popular way of selling goods and services, referred to herein collectively and interchangeably as "items," to consumers. Activities of electronic commerce typically, but not exclusively, include browsing for items to purchase; comparing various aspects such as price, color, warranties, and the like of items for purchase; inspecting product details of an item; purchasing one or more items; and the like. The popularity of electronic commerce (sometimes referred to as "e-commerce") has prompted more and more vendors to make their goods and services available over electronic networks, such as the Internet, and computer users have correspondingly embraced electronic commerce as a legitimate shopping environment.

Both vendors and computer users benefit from electronic commerce in a variety of ways. For example, users do not have to travel to a number of vendor locales to purchase a given item. Rather, a user can now purchase a desired item from the convenience of his or her home. Further, users can quickly compare a wide variety of similar items and prices from a number of vendors in order to make an informed choice in their purchases rather than spending an entire afternoon in comparison shopping. Vendors are benefited in that they can reach a much larger group of customers than those who reside in their geographic vicinity.

One feature of electronic commerce with which customers are familiar and upon which vendors have increasingly come to rely is a recommendations feature, i.e., when a customer selects an item for purchase, or places an item on a wish or gift list, the hosting electronic commerce site provides one or more recommendations of alternative and/or complimentary items that the customer may also wish to purchase. These recommendations may be based upon any number of criteria including the customer's prior purchases and purchase tendencies, recommendations from the product vendor, what other customers have purchased, top sellers or recent releases, product categories, genres, types, consumer feedback, and the like. Indeed, substantial research and development effort has been made into providing highly relevant alternative and/or complimentary recommendations to a customer in order to increase the likelihood that the customer will purchase one or more of the recommended items.

As an example of an electronic commerce site generating recommendations, FIG. 1A is a pictorial diagram of an illustrative browser view 100 showing the display results of adding an item 104 to a wish list. More particularly, the display results 102 include a display of the item 104 and a set of recommended items 108, including recommended item 110. As can be seen, in this illustrative browser view 100, each recommended item may also be added to the wish list via a corresponding control, such as control 112, which will then display the newly added item with another set of recommended items. Also shown is a link 106 to view the contents of the wish list.

Since the consumer added item 104 to her wish list, and assuming that the consumer now wants to view the contents of her wish list, the consumer clicks on the link 106, resulting in the electronic commerce site outputting a view of the updated wish list. To that end, FIG. 1B is a pictorial diagram of an illustrative browser view 100 showing the updated wish list 120. As can be seen, the item 104 is now on the wish list, as well as other wish list items, such as item 122. However, the recommended items 108 previously displayed are not displayed/included as they are not part of the wish list. Moreover, since the item 104 is now on the wish list, those recommendations cannot be readily re-viewed. Indeed, typically the only way to see the recommended items again is to delete the item 104 from the wish list, revisit that item on the electronic commerce site, and add it again to the wish list, which will result in the intermediate step of displaying the item 104 with recommended items 108 as shown in FIG. 1A. Clearly, while revisiting a set of recommended items is not impossible, it is, at best, very inconvenient.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system for presenting a set of recommended items corresponding to a first item is presented. The system comprises a processor, a memory; and a computer executable component. The computer executable component executes on the system, via the processor, and is configured to perform the following. An indication is received requesting the display of recommended items corresponding to the first item. A set of recommended items corresponding to the first item is then obtained. Display information is generated for displaying a list of items, the list of items comprising a plurality of items, and the corresponding set of recommended items. The list of items includes the first item. Additionally, display information is provided, the display information for displaying the list of items and the corresponding set of recommended items on a consumer device.

In accordance with an alternative embodiment, a system for maintaining recommended items in association with a corresponding list item is presented. The system comprises a processor, a memory, and a computer executable component that executing via the processor. The computer executable component is configured to perform each of the following steps. Display information is generated for displaying a first item and a first set of recommended items corresponding to the first item. The display information, for displaying the first item and the set of recommended items corresponding to the first item, is provided for display on a consumer device. Moreover, As yet another step, an indication requesting the display of recommended items corresponding to the first item of a plurality of items on a list is received. In still another step, a set of recommended items corresponding to the first item is obtained. A further step includes generating display information for displaying the list of items and the corresponding set of recommended items. As yet a further step, display information is provided for displaying the list of items and the corresponding set of recommended items on a consumer device.

According to yet another embodiment of the present invention, a computer-implemented method for maintaining and displaying recommended items corresponding to a base list element is presented. The method comprises the following as executed on a computing device. As one step of the method, a consumer is enabled to add a first item to a list of items, including at least one additional item, via a browser. In another step, a set of recommended items corresponding to the first item is obtained. Finally, display information is provided for displaying the list of items, including the first item, and the set of recommended items corresponding to the first item for display on a consumer device.

According to yet a further embodiment, a computer-readable medium having a computer-executable component for maintaining recommended items corresponding to a base list item is presented. The computer-executable component comprises a user interface component. The user interface component is configured for enabling a consumer to add a first item to a list of items, including at least one additional item, via a browser. Moreover, the user interface component is further configured for obtaining a set of recommended items corresponding to the first item. Finally, the user interface component is further configured for providing display information for displaying the list of items, including the first item, and the set of recommended items corresponding to the first item for display on a consumer device

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In the following description, numerous specific details are set forth in order to provide a thorough understanding of the present invention. However, it will be apparent to one skilled in the art that the invention may be practiced without some or all of these specific details. In other instances, well-known process steps have not been described in detail in order not to unnecessarily obscure the invention.

Figure 1A:
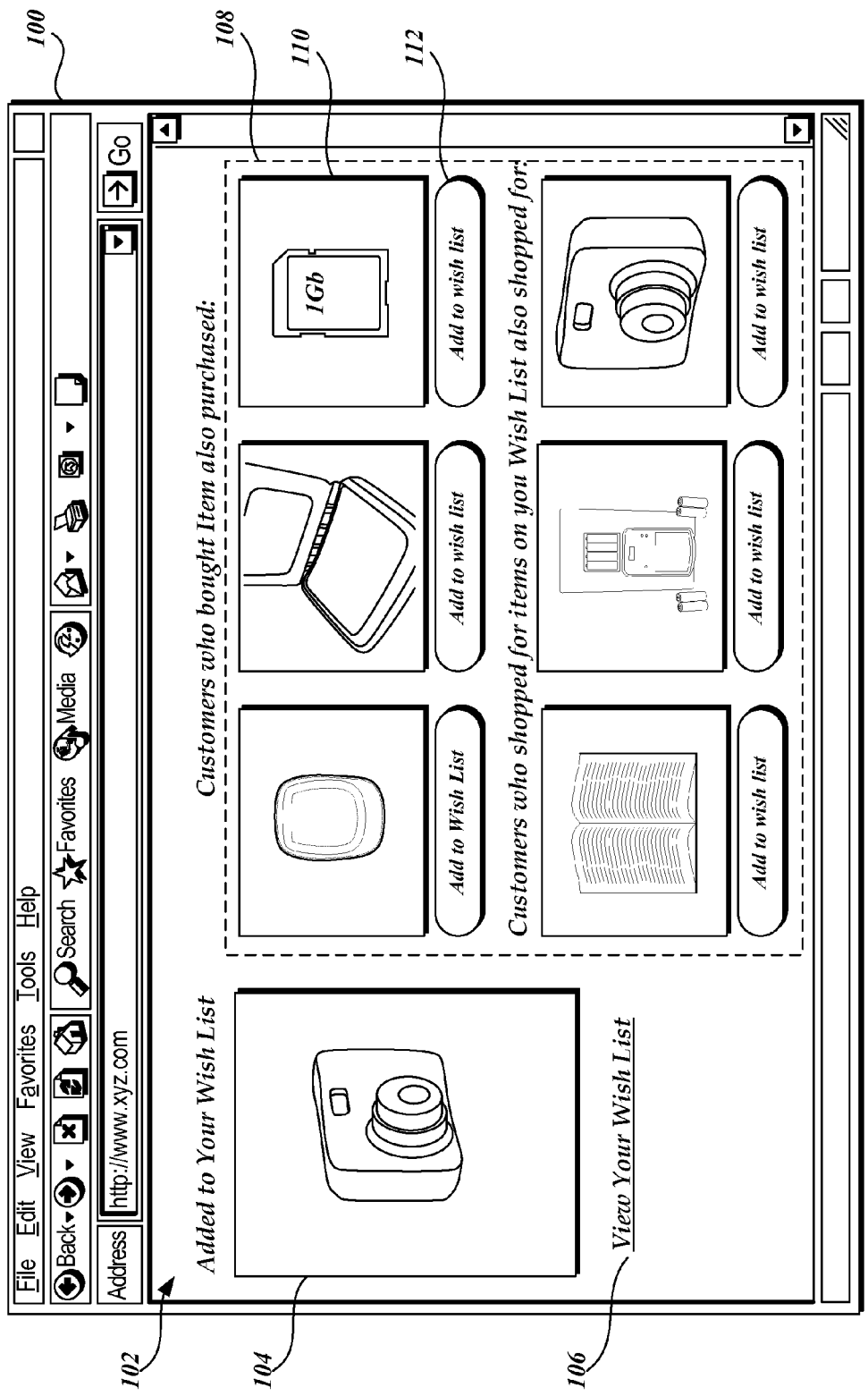
FIGS. 1A and 1B are pictorial diagrams of illustrative display views from an electronic commerce site for adding an item to a wish list and illustrating how recommendations are displayed and lost, as found in the prior art.

By way of definition, an item added to a list to which a set of recommended items will be or is associated is referred to hereafter as a base item. For example, item 104 (of FIG. 1A) is a base item. With regard to recommended items, it should be appreciated that recommended items may include any number of items available from the electronic commerce site. As indicated above, recommended items include, but are not limited to, alternative and/or complimentary items. Recommended items may further include items that are entirely unrelated to the base item.

The following description will be made with regard to displaying recommendations corresponding to one or more base items on a wish list, i.e., a list of items that is populated by a consumer as desirable/desired items. However, it should be appreciated that aspects of the present invention may be applied to a single base item or based items from any formal or informal list. Examples of formal and informal lists includes, but are not limited to, wish lists, gift lists, electronic purchase carts, lists of purchased items or browsed items, and the like. Accordingly, while the subsequent discussion is generally directed to base items on a wish list, this is for simplicity of presentation and should not be construed as limiting upon the present invention.

It should be further appreciated that while the following description is made in regard to electronic commerce, i.e., displaying recommended items corresponding to base items for purchase, aspects of the present invention may also be applied to non-commercial sites. For example, recommendations may be provided when a patron, visiting a library's electronic catalog, adds to or views items on the patron's list of books to be read. Accordingly, the discussion with regard to providing recommended items corresponding to base items in an electronic commerce setting should be viewed as illustrative only, and not construed as limiting upon the present invention.

Figure 2:
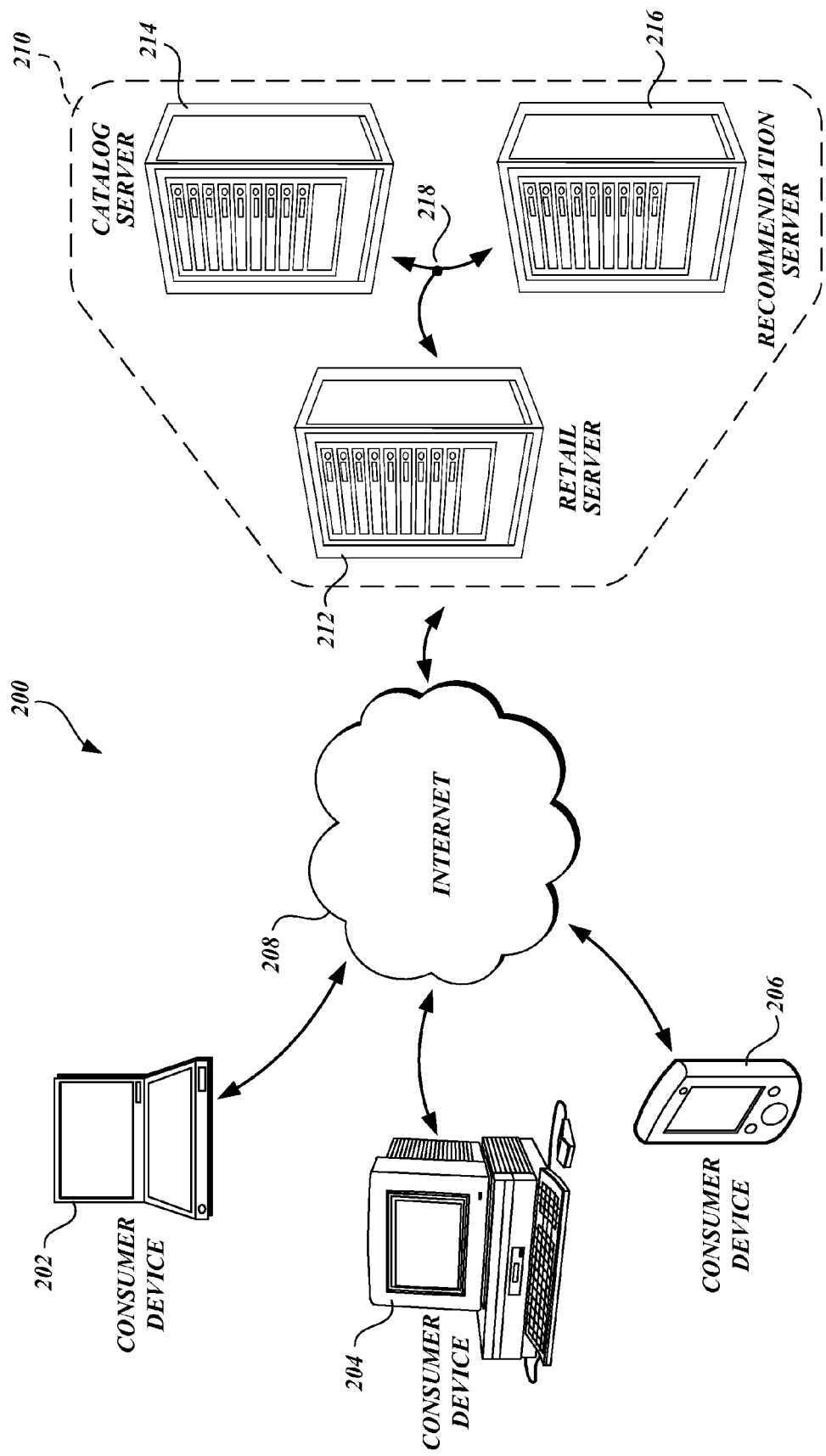
FIG. 2 is a pictorial diagram of an illustrative network environment suitable for retaining and displaying recommendations made in conjunction with their base list items.

With regard to the operating environment suitable for implementing aspects of the present invention, while there are numerous environments in which electronic commerce, or e-commerce, may occur, FIG. 2 is a pictorial diagram of an illustrative networked environment 200 suitable for providing display information to a consumer device showing one or more base items with corresponding recommended items. The illustrative networked environment 200 of FIG. 2 includes one or more consumer devices, such as consumer devices 202-206, through which consumers (not shown) can conduct electronic shopping. The consumer devices communicate via a communication network, such as the Internet 208, with a network shopping service 210 to conduct electronic shopping.

Consumer devices, such as consumer devices 202-206, include a variety of configurations and forms such as, but not limited to, laptop or tablet computers, personal computers, personal digital assistants (PDAs), hybrid PDA/mobile phones, mobile phones, electronic book readers, workstations, and the like. Generic components of a consumer device are described below in regard to FIG. 3.

Figure 3:
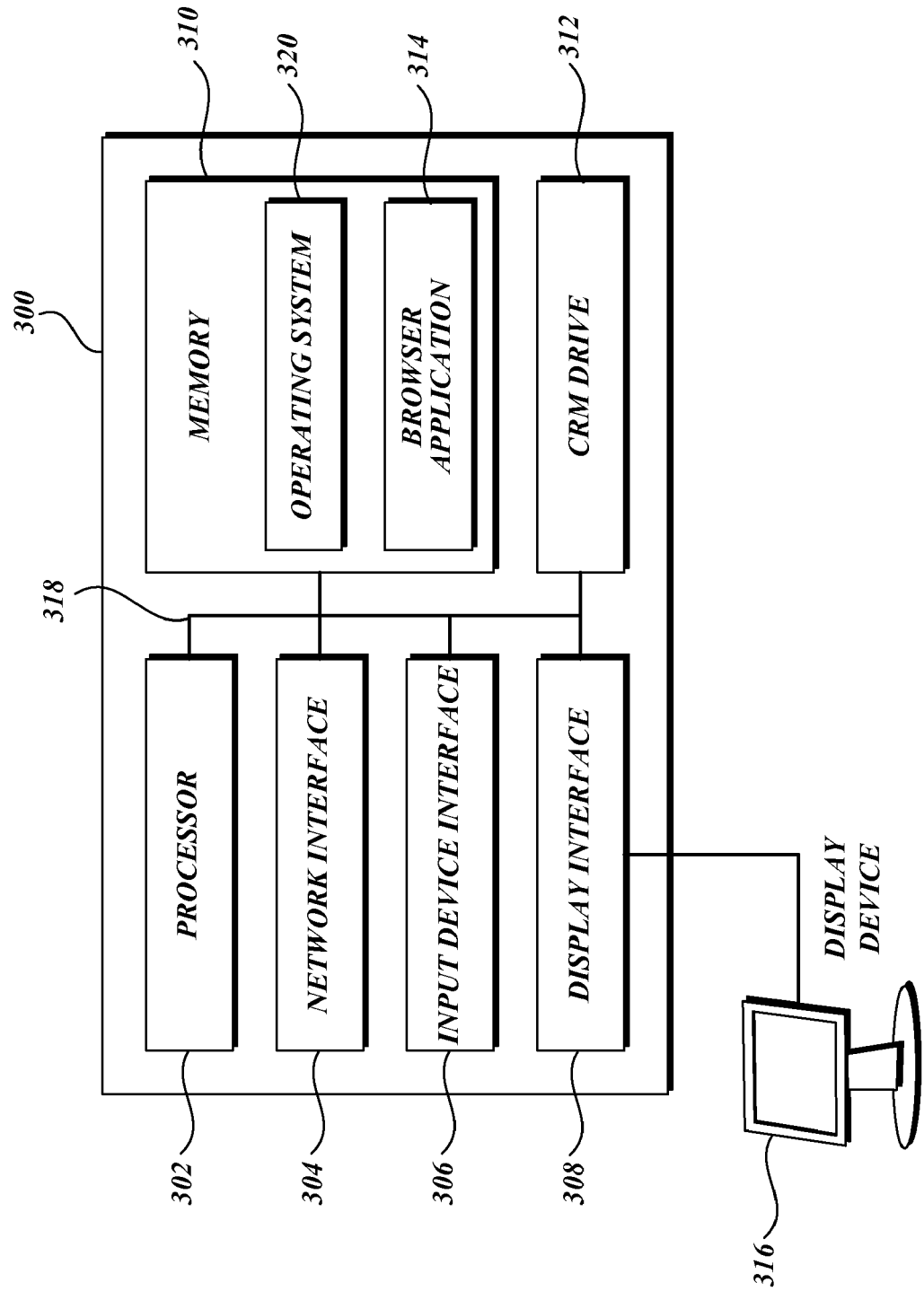
FIG. 3 is a block diagram of illustrative components of a consumer device suitable for interacting with an electronic commerce site, and viewing base list items and corresponding recommended items.

FIG. 3 is a block diagram of illustrative components of a consumer device 300 suitable for conducting electronic shopping and viewing base items with corresponding recommended items received via a communication network such as the Internet 208. Of course, while various components are described below, those skilled in the art of computers will recognize a wide selection of commercially available components that can be used to construct a consumer device suitable for conducting electronic commerce activities according to aspects of the present invention. Accordingly, the following description of components of a consumer device should be viewed as illustrative only and not construed as limiting in any manner.

With regard to FIG. 3, the illustrated consumer device 300 includes a processor 302 in communication with a variety of other components over a system bus 318. The illustrated components include, by way of example, a network interface 304, an input device interface 306, a display interface 308, an optional computer-readable medium drive 312, and a memory 310. As appreciated by those skilled in the art, the network interface 304 enables the consumer device 300 to communicate data, control signals, data requests, and other information with a computer network such as the Internet 208 (FIG. 2). The network interface 304 may be configured to communicate with the Internet 208 over a wired or wireless connection (not shown).

The input device interface 306, sometimes also embodied as an input/output interface, enables the consumer device 300 to obtain input from the consumer, part of which is directed to the purchase. Input devices (not shown) in communication with the input device interface 306 may include, but are not limited to, a digital pen, a touch screen, a keyboard, a mouse, and the like. In addition, a display interface 308 is typically connected to a display device 316 (e.g., a CRT monitor, an LCD screen, a television, etc.) for visually displaying information to the consumer. Those skilled in the art will appreciate that the display device 316 may be incorporated within a consumer device as an integral element of the consumer device or, alternatively, may be an external component that is attached to the consumer device. FIG. 3 illustrates that the display device 316 is external to the consumer device 300, but this is illustrative only.

The processor 302 is configured to operate in accordance with programming instructions stored in a memory, such as the memory 310. The memory 310 generally comprises RAM, ROM, and/or other permanent memory. Thus, in addition to storage in read/write memory (RAM), programming instructions may also be embodied in read-only format, such as those found in ROM or other permanent memory.

The memory 310 also typically stores an operating system 320 for controlling the general operation of the consumer device 300. The operating system may be a general purpose operating system such as a Microsoft® operating system, a UNIX® operating system, a Linux® operating system, or an operating system specifically written for and tailored to a particular consumer device 300. The memory 310 may further store user-executable applications or programs for conducting various functions on the consumer device 300. For example, FIG. 3 illustrates that memory 310 includes a browser application 314 that may be used by the consumer to navigate on the Internet 208 and through which the consumer may communicate via the Internet 208 to interact with electronic shopping services provided by the network shopping service 210. Examples of a browser application 314 include Microsoft's Internet Explorer®, Mozilla's Firefox, Opera, and the like.

The computer-readable medium drive 312 provides an optional and alternative means by which a consumer may store information and/or retrieve external information. Examples of computer-readable medium drives include, but are not limited to, CD-ROM drives, DVD-ROM drives, floppy disk drives, USB drives, flash memory card readers, and the like. Of course, while a computer-readable medium drive 312 is shown in the illustrative consumer device 300, it should be viewed as an optional component. Those skilled in the art will appreciate that not all consumer devices include a computer-readable medium drive 312. However, regardless of whether or not a consumer device 300 includes a computer-readable medium drive 312, the consumer device may be entirely suitable for viewing base items and corresponding recommended items provided by a network shopping service 210.

With reference again to FIG. 2, as mentioned above, the consumer devices 202-206 are connected to a network shopping service 210 via a communication network, such as the Internet 208. The network shopping service 210 provides pages offering retail services to consumers via their consumer devices for conducting shopping activities, including presenting recommended items in conjunction with one or more base items.

While illustrated in FIG. 2 as comprising multiple servers, the network shopping service 210 may comprise one or multiple servers or discrete components to provide shopping and retail services over a network. As particularly shown in FIG. 2, the illustrated network shopping service 210 is comprised of multiple components, including a retail server 212 that provides the "front end" interface to consumers via their consumer devices 202-206, a catalog server 214 that provides general information for items available for purchase from the network shopping service, and a recommendation server 216 that generates a list of recommended items in association with a base item and provides display information regarding the one or more base items and recommended items to a consumer device for display. Of course, those skilled in the art will, of course, appreciate that the various servers/components of the network shopping service 210 depicted in FIG. 2 are illustrative only. As mentioned above, an actual embodiment of a network shopping service 210 may be comprised of a single server or a plurality of discrete, cooperative servers distributed in a communications network 218. Similarly, the identified components of the network shopping service 210 should be viewed as logical components only, as each separately identified component, such as the catalog server 214, the retail server 212, and the recommendation server 216, may be physically embodied on one or more computer systems, as well as combined with other hardware and/or software components not illustrated herein.

Figure 4:
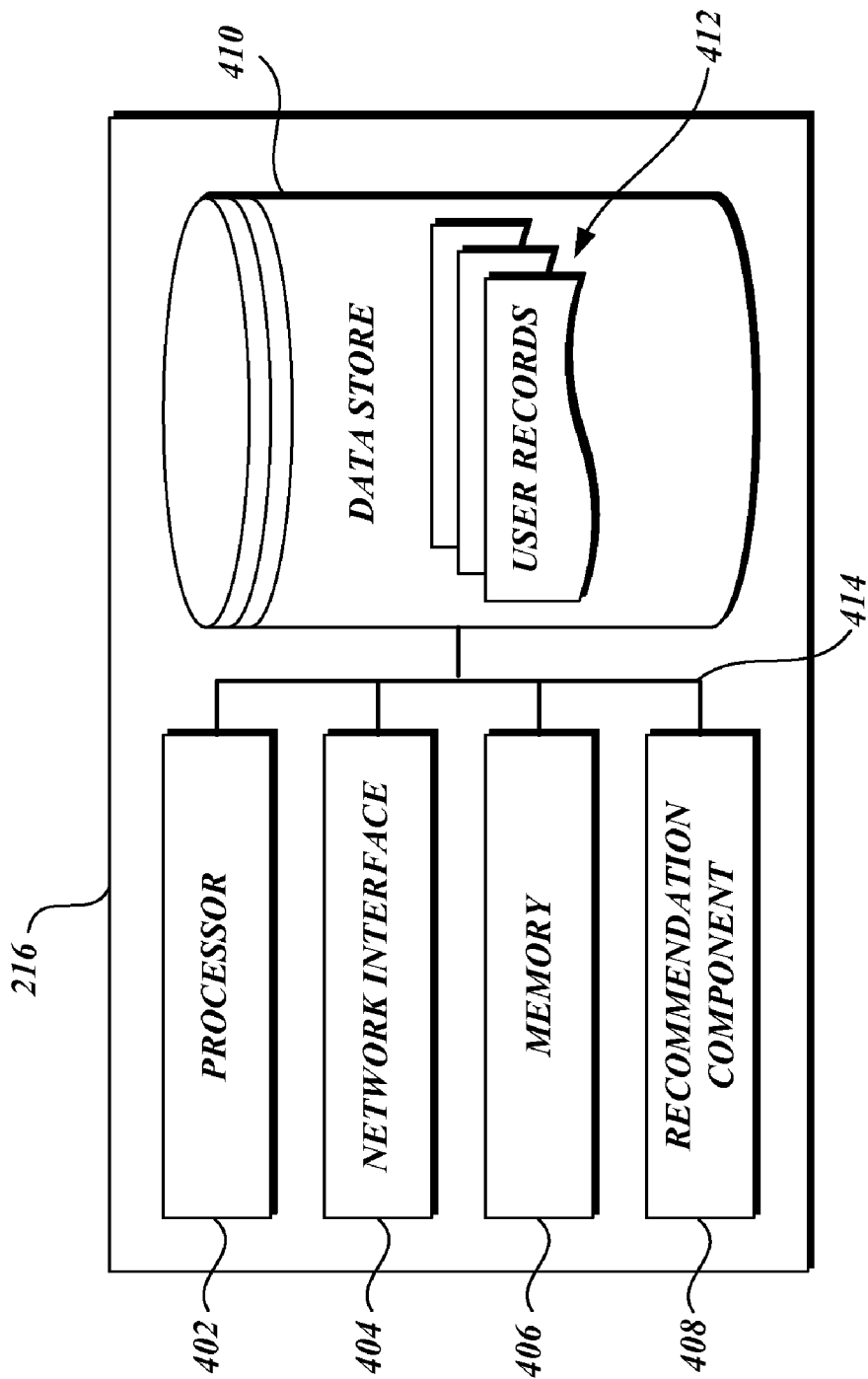
FIG. 4 is a block diagram of illustrative components of a recommendation server suitable for use in the networked environment depicted in FIG. 1 for retaining and displaying recommended items in conjunction with a base list item.

As mentioned above, FIG. 4 is a block diagram of illustrative components of a recommendation server 216 suitable for use in the networked environment 200 depicted in FIG. 2 for providing display information regarding recommended items in conjunction with one or more base items. As mentioned above, the recommendation server 216 will typically generate a set of recommended items corresponding to one or more base items, and present the recommended items in conjunction with the base items for display to a consumer device. However, while the recommendation server 216, as illustrated in FIG. 4, is demonstrated as a single integrated computing device, this is illustrative only. In an actual embodiment, the recommendation server 216 may be embodied in a plurality of servers or integrated with one or more other servers within the network shopping service 210.

The illustrative recommendation server 216 includes a processor 402 in communication with a variety of other components over a system bus 414. As will be described below in greater detail, the processor 402 executes one or more code modules that carry out the recommendation services described below. The illustrative recommendation server 216 also includes, but is not limited to, a network interface 404, a memory 406, and an optional data store 410.

As with the consumer device 300 (FIG. 3), the processor 402 is configured to operate in accordance with programming instructions stored in the memory 406, which is generally comprised of RAM, ROM, and/or other permanent memory. The memory 406 will typically store an operating system (not shown) for the recommendation server 216 upon which, and with which, most other programs/applications operate, including the recommendations component 408. Additionally, while the recommendations component 408 is illustrated as existing outside of the memory 406, this is for illustration purposes only. Under most circumstances, the recommendations component 408 will reside within the memory 406.

The network interface 404 is used by the recommendation server 216 to communicate with other components of the network shopping service 210 and/or a consumer device in providing the recommendation server's functionality. The optional data store 410 may be embodied in any number of configurations and storage arrangements including, but not limited to, relational databases, lists, flat-file databases, and the like. While a variety of information may be stored in the data store 410, according to one embodiment, the data store 410 stores user records 412 of lists created by the user, such as wish lists, gift lists, browsed item lists, and the like. Of course, lists such as these may alternatively be stored in another location in the network shopping service 210. Typically, the data store 410 is configured to store user records 412 for a plurality of consumers.

According to aspects of the invention, recommendations corresponding to one or more items can be viewed in the context of a recommendation viewer without requiring a consumer to add an item to a wish list, gift list, or the like. In fact, according to various embodiments, a consumer may gain access to the recommendation viewer via a variety of paths, two of which are illustrated in regard to FIGS. 5A and 5B. In particular, FIGS. 5A and 5B are pictorial diagrams of illustrative entry points to a recommendation viewer operating according to aspects of the present invention.

Figure 5A:
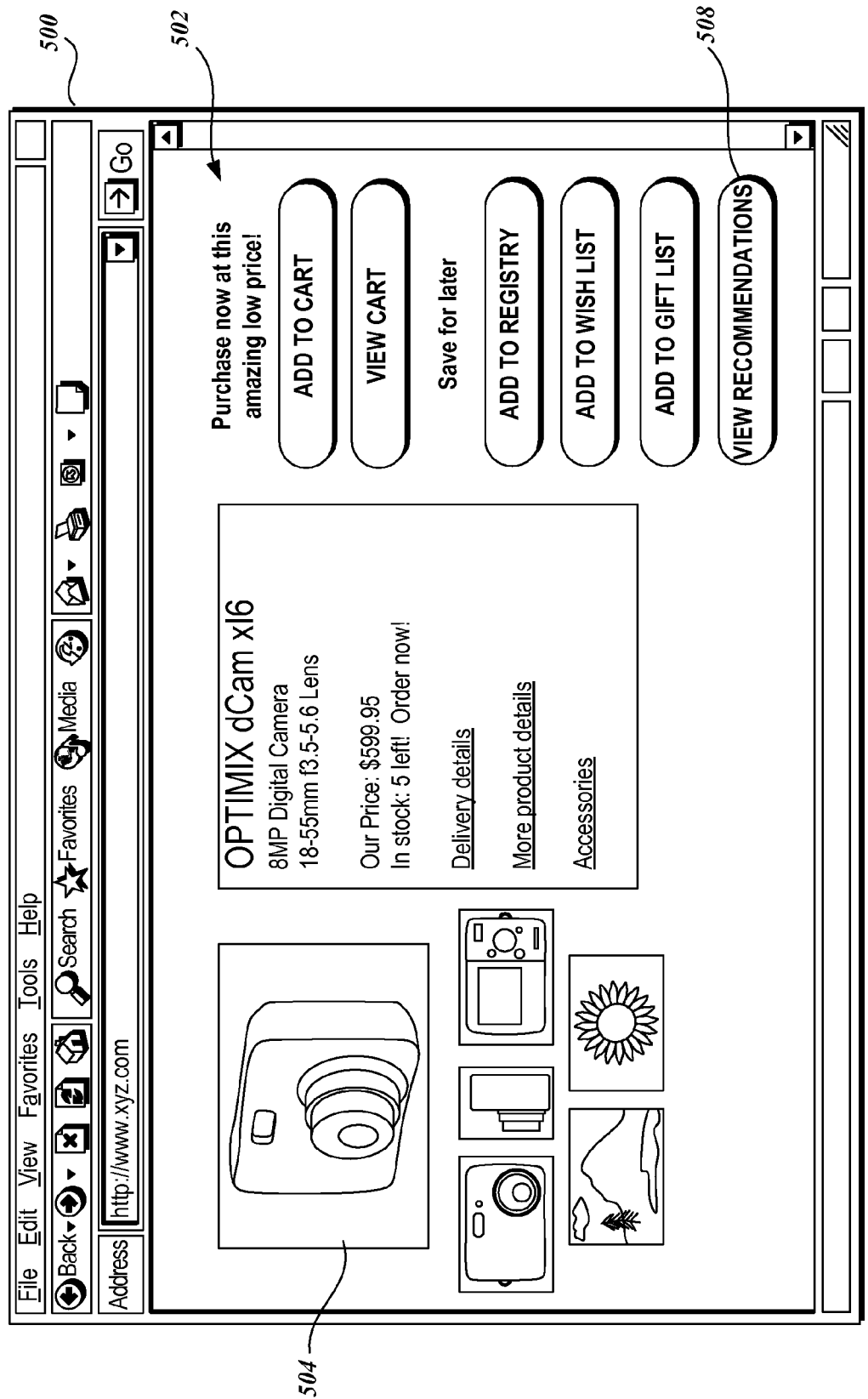
FIGS. 5A and 5B are pictorial diagrams of illustrative entry points to a recommendation viewer operating according to aspects of the present invention.
Figure 5B:
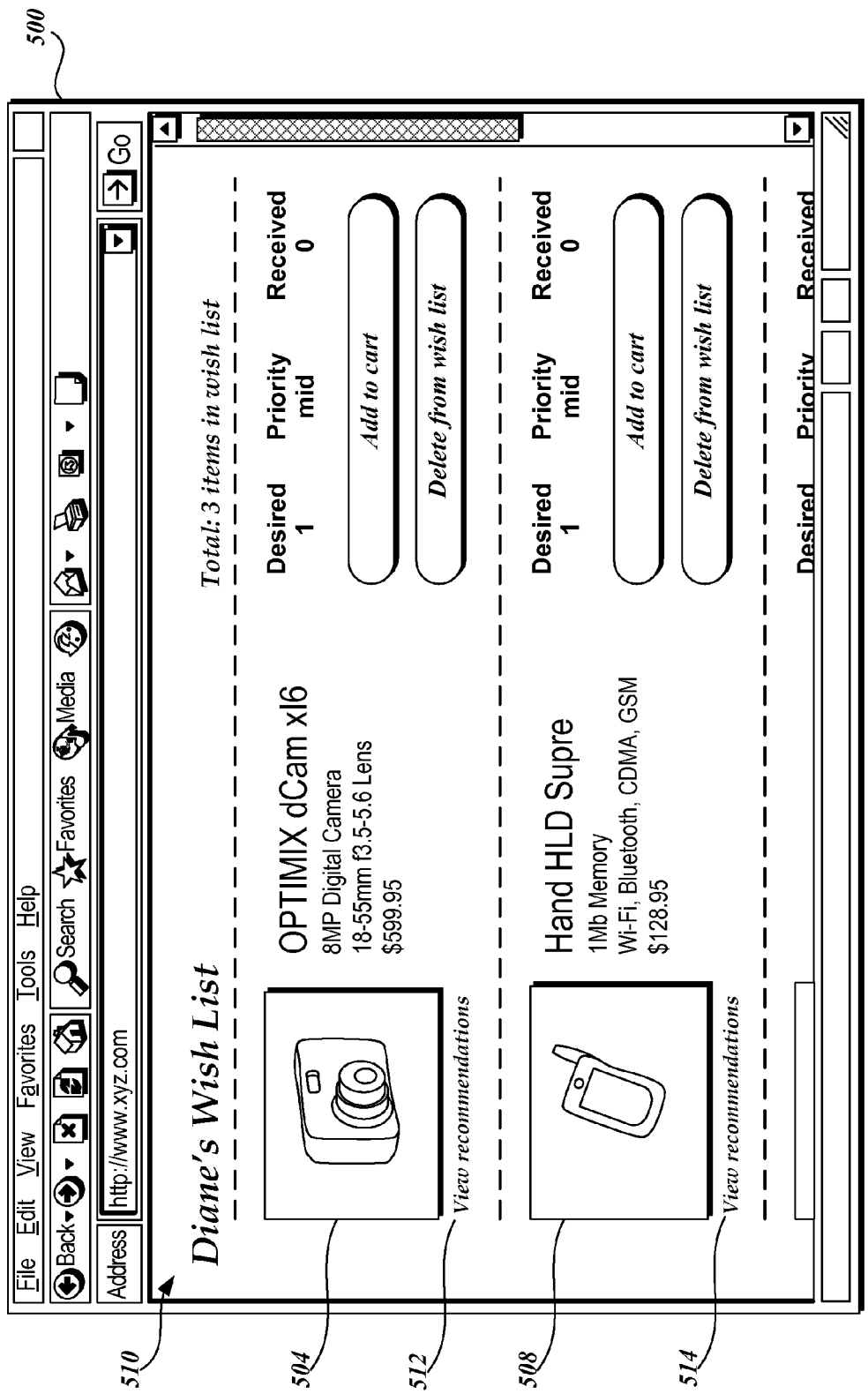
Figure 6A:
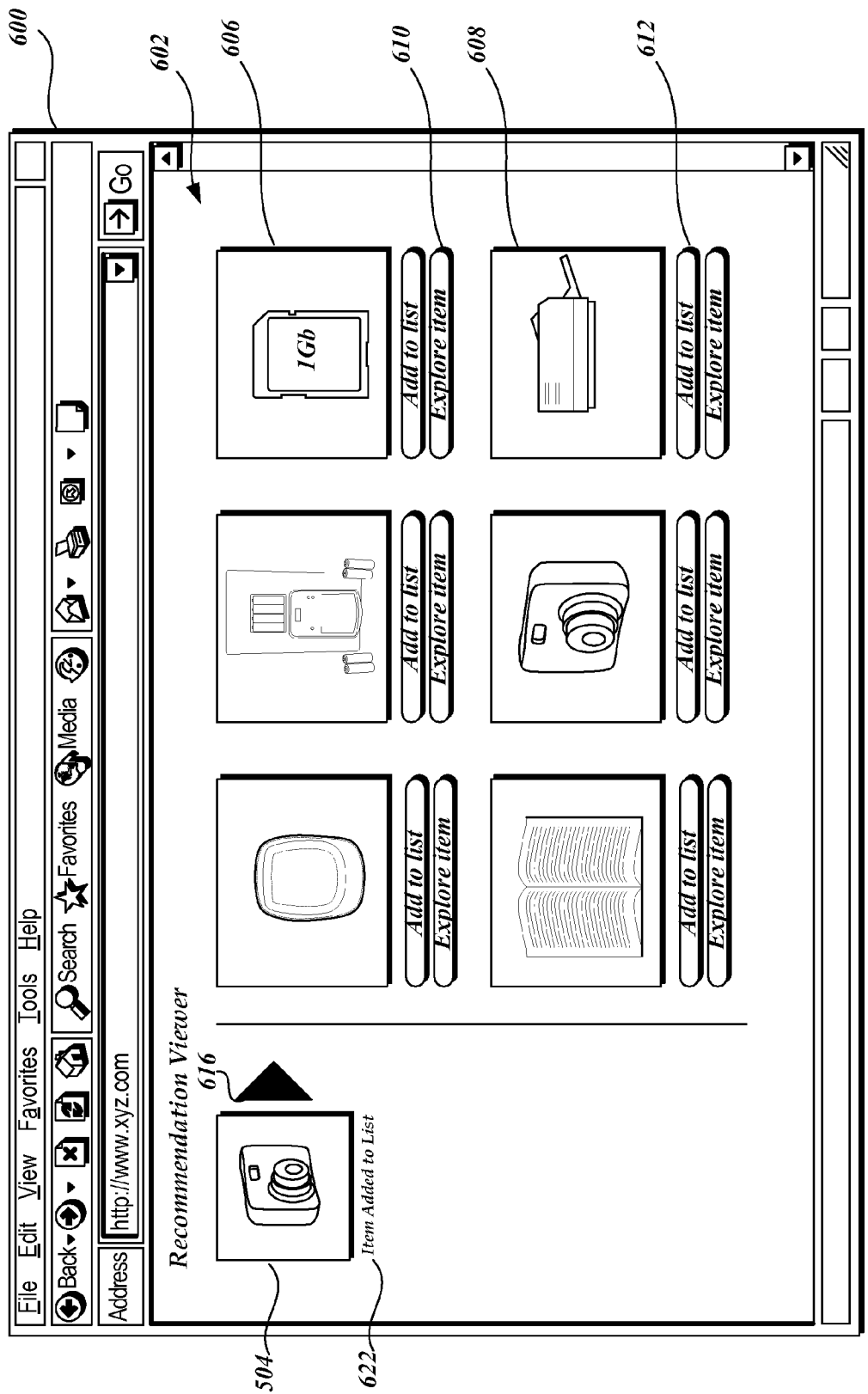
FIGS. 6A-6F are pictorial diagrams of an illustrative display view showing a recommendation viewer of items in conjunction with corresponding recommended items, and for further illustrating aspects of interaction with the recommendation viewer.

In regard to FIG. 5A, this pictorial diagram shows an illustrative display view 500 including display results 502 as may be displayed on the display device of a client computer. Moreover, this sample display illustrates a typical view of examining an item 504 for purchase. According to one embodiment, an item need not be added to any particular list or electronic shopping cart in order to view recommendations via a recommendation viewer. Instead, a control 508 is included with the display results 502 that acts as an entry point to a recommendation viewer (such as illustrated in FIG. 6A). Of course, the control 50, shown as an actionable button in the display results 502, is just one example of many controls and links that can act as an entry point to a recommendation viewer. Accordingly, the illustrated control 508 should be viewed as one example only, and not construed as limiting upon the present invention.

When recommendations are requested with regard to a single item, such as item 504 in FIG. 5A, and not to items on any particular defined list, a temporary list is created, the temporary list including that single item. Of course, other items may be added to that temporary list while viewing the recommendations in the recommendation viewer, as will be discussed in regard to FIGS. 6A-6F and FIGS. 9A and 9B. However, any items added to a temporary list will, by default, typically not be saved.

In contrast to viewing recommended items in association with a browsed item, when recommendations for an item in association with a predefined list is requested, the elements of the predefined list are used by the recommendation view. FIG. 5B is a pictorial diagram of an illustrative entry point to a recommendation view from viewing the contents of a wish list. More particularly, FIG. 5B includes a display view 500 showing display results 510 as might be displayed on a consumer device.

The display results 510 show various items (items 504 and 508) from a sample consumer's wish list as might be provided by a typical electronic commerce site. However, in contrast to the display of items on a wish list, FIG. 5B also includes actionable links 512 and 514 by which a consumer may view recommendations for a particular item. Additionally, when viewing recommendations from an item in a list, such as the wish list shown in FIG. 5B, the recommendation viewer may populate the list items to be viewed with the elements of the defined list.

As indicated above, FIGS. 6A-6F are pictorial diagrams of an illustrative display view 600 of a recommendation viewer 602 listing items in conjunction with corresponding recommended items, and for further illustrating aspects of consumer interaction with the recommendation viewer. It should be appreciated, however, that while the discussion of FIGS. 6A-6F is made in regard to a wish list, this is illustrative only and should not be construed as limiting upon the present invention. As indicated above, a recommendation viewer may display recommended items for elements of any predefined list, as well as temporary lists.

As shown in FIG. 6A, the wish list, and therefore the recommendation viewer 602 displaying the wish list, currently includes only one item, item 504 on the left side of the recommendation viewer 602. Indicator 616, next to item 504, indicates which of the wish list items is currently selected, and therefore, to which item the set of recommended items corresponds. As shown in FIG. 6A, the set of recommended items corresponding to item 504 includes items 606 and 608. Indicator 622 is displayed indicating that item 504 is currently added to the wish list.

Also shown in FIG. 6A are controls, such as controls 610 and 612, which a consumer can activate to "explore" recommendations corresponding to that item. For example, by clicking on control 610, item 606 is temporarily added to the wish list. An item is temporarily added to a predefined list in that the item, such as item 606, is displayed as among the list elements in the recommendation viewer 602 but is not currently saved/stored as an item on the list. Of course, if the list being viewed corresponds to a temporary list, controls and/or links to save the items to a list may be alternatively presented.

Figure 6B:
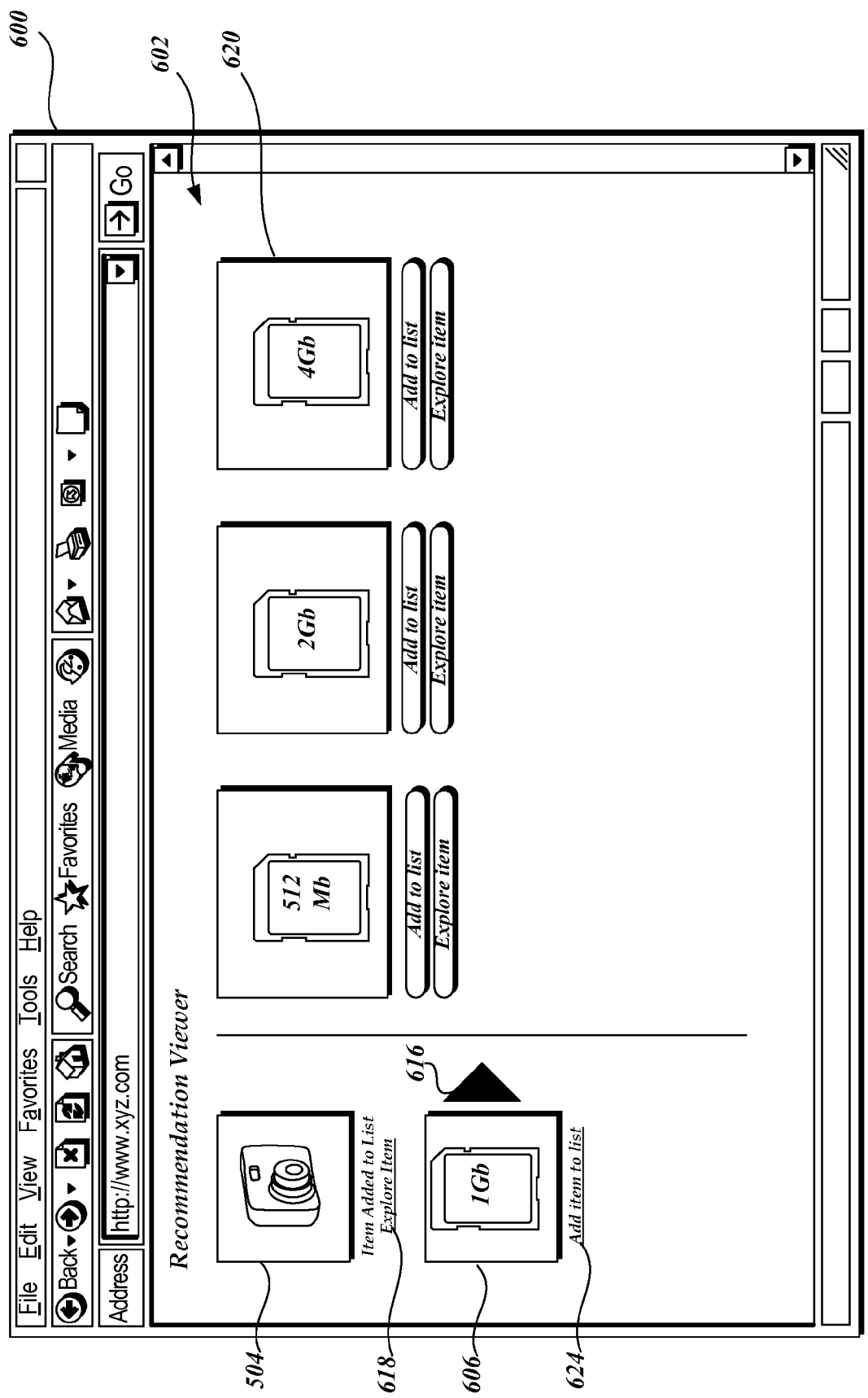
Figure 6C:
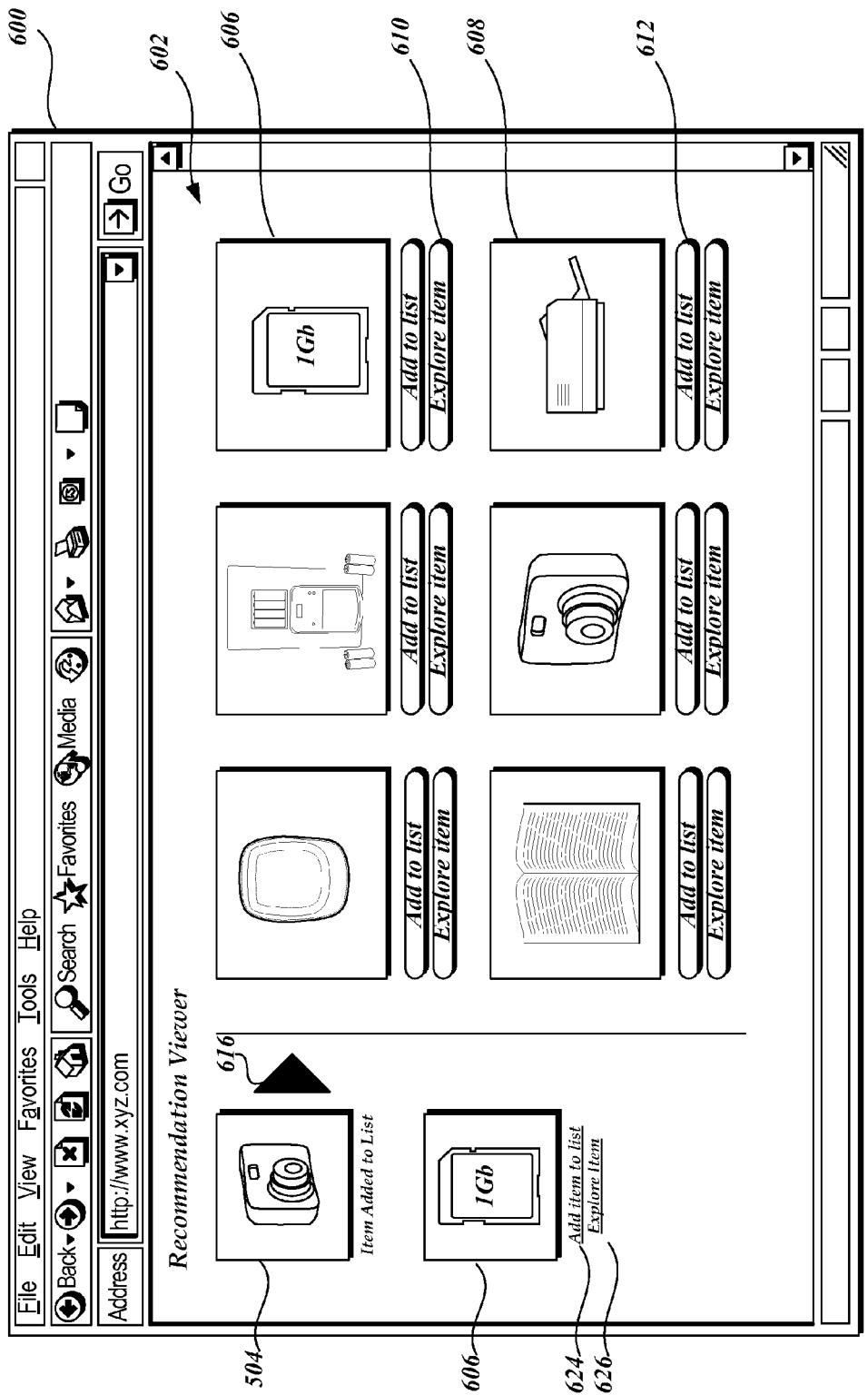

Assuming that the consumer activates control 610 to explore recommendations corresponding to item 606, item 606 is placed temporarily on the currently viewed list (in this case the wish list) as illustrated in FIG. 6B. Moreover, indicator 616 is now located next to item 606 in the list view portion of the recommendation viewer 602. As item 606 is now being "explored," the recommendation viewer 602 now displays recommended items, including item 620, corresponding to item 606. Control 624 is located near item 606 to provide a means to permanently add item 606 to the current list, in this case the wish list. Similarly, in order to return to exploring/viewing the recommendations for item 504, the user may activate link 618 (which is added to reflect that recommended items for item 504 are not being explored) or, alternatively, double click on item 504.

Assuming now that the consumer activates link 618 to return to viewing the recommendations corresponding to item 504, the recommendation viewer 602 displays the results shown in FIG. 6B, which includes item 504, item 606 (temporarily on the wish list), and recommended items corresponding to item 504. Indicator 616 is displayed next to item 504 to reflect this "selected" status. Still reflecting the fact that item 606 is temporarily on the wish list, link 624 is displayed under item 606. Also, in order to return to viewing the recommendations corresponding to item 606, link 626 is also added.

In regard to the redisplay of recommended items corresponding to item 504, according to one embodiment, the set of recommended items may be cached on a consumer device such that when returning to display the recommended items, they can be retrieved and displayed. On the other hand, if an item displayed by the recommendation viewer does not have a cached list, when selected, the recommendation server generates a set of recommended items for display.

Figure 6D:
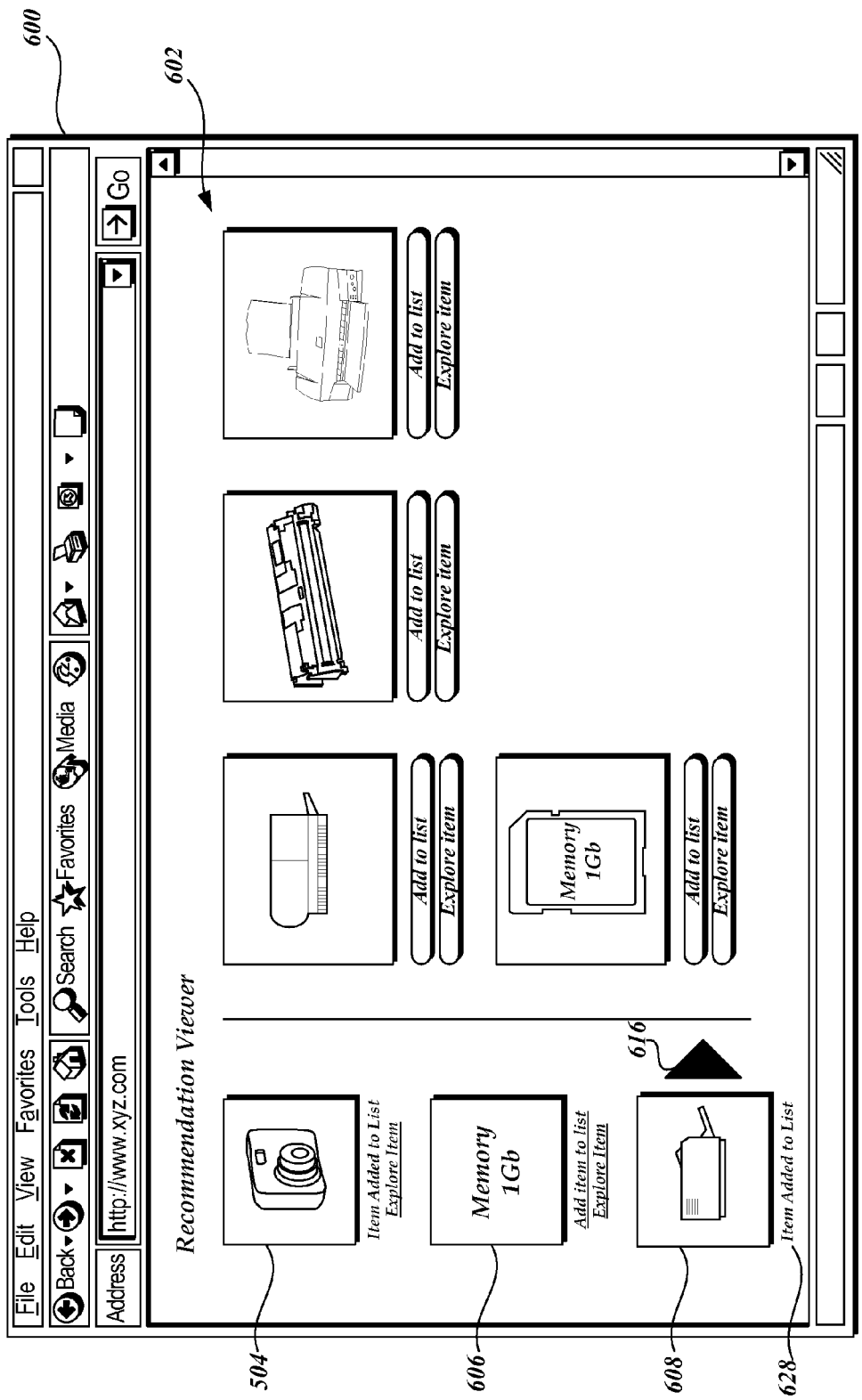

Assuming that the consumer would like to add item 608 to the wish list, the consumer activates the control 612. By adding item 608 to the list, rather than exploring an item as described above, item 608 is stored with the other items of the wish list (in this case item 504) in a data store accessible by the network shopping service 210. FIG. 6D is a pictorial diagram illustrating the recommendation viewer 602 displaying the wish list from the examples above with newly added item 608 and its corresponding set of recommended items. As can be seen, indicator 616 is now located next to item 608, and link 628 is positioned below item 608 indicating that this item has been added to the wish list.

Figure 6E:
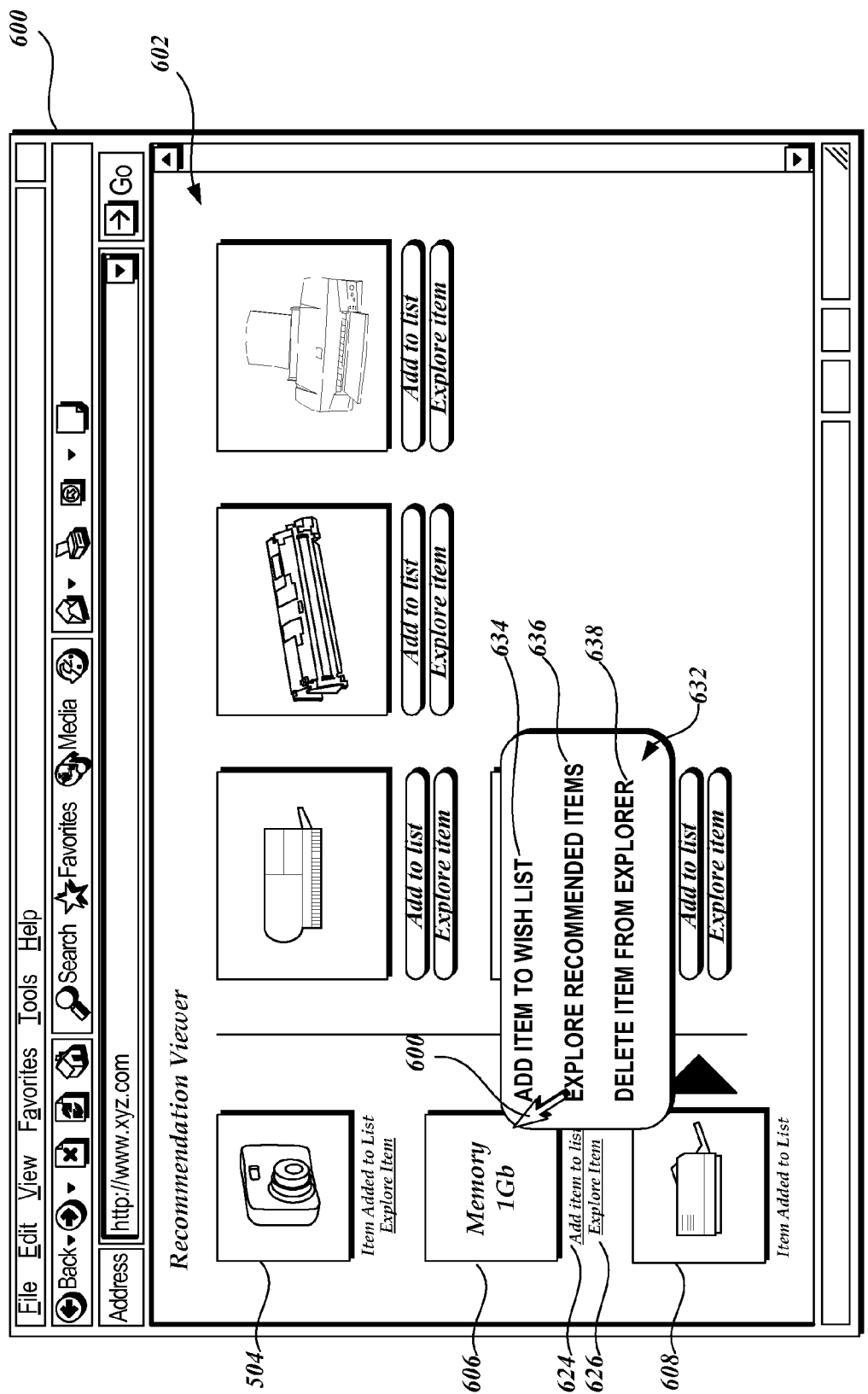

In addition to the ability to add items to a list, both permanently and temporarily, interaction also includes deleting an item displayed in the recommendation viewer 602 from the list. Continuing the example from above, assuming that the consumer now wishes to delete item 606 from the list (where it is temporarily stored), the recommendation viewer may offer a link and/or control to remove the item (not shown), or alternatively, the consumer may position a cursor over the item and activate a menu of options, such as by right-clicking on that item. FIG. 6E illustrates the results of right-clicking on item 606.

As can be seen in FIG. 6E, by positioning a cursor 630 over item 606 and right clicking on that item, a menu 632 of options is presented. These options may include both items that were already available to the consumer, such as links 624 and 626 corresponding to options 634 and 636, as well as those that were not readily available, such as option 638. By positioning the cursor 630 over one of the options and selecting that option (typically by clicking), the consumer can opt to perform any one of those actions on the item 606. For example, if the consumer locates the cursor 630 over option 638 and clicks/selects that option, item 600 is removed from the list of viewed items, as illustrated in FIG. 6F.

Figure 6F:
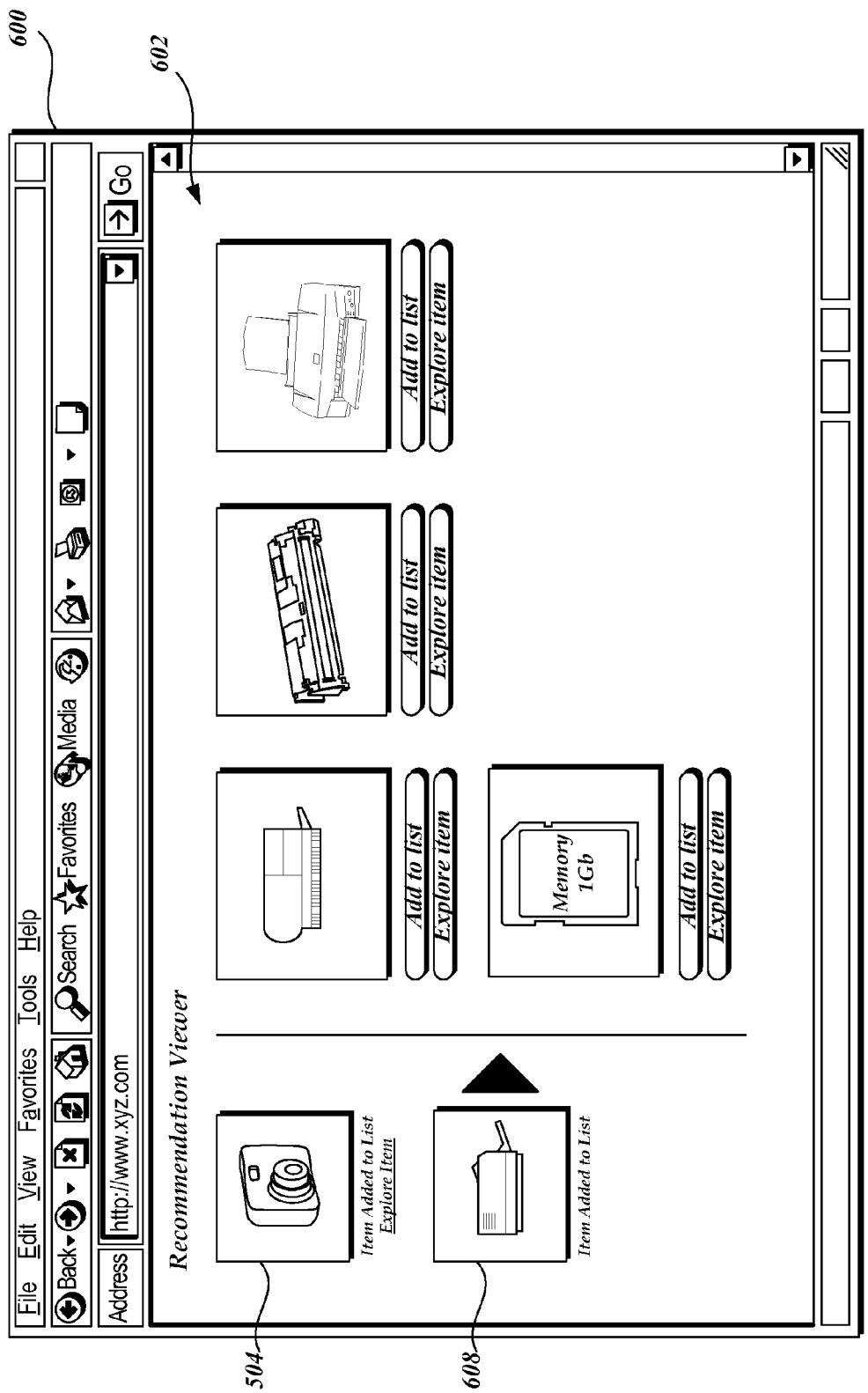

As will be appreciated, item 606 (deleted from the list as shown in FIG. 6F) may be re-added, at least temporarily to the list of items in the recommendation viewer 602, as discussed above in regard to FIGS. 6A and 6B. This, of course, illustrates one of the many advantages of the present invention in that a consumer can interact with multiple sets of recommended items.

With regard to the illustrative recommendation viewer 602 of FIGS. 6A-6F, it should be appreciated that the arrangement of the viewed list and set of recommended items, as well as the various controls for interacting with the recommendation viewer, are illustrative only, and should not be construed as limiting upon the present invention. Those skilled in the art will readily appreciate and recognize that there are numerous layouts, controls, and links that may be combined to form a suitable recommendation viewer, each of which is anticipated as falling within the scope of the present invention. Similarly, additional controls, such as controls for deleting items from a list, while omitted in the above discussion, may be included in an actual embodiment of a recommendation viewer 602.

Figure 7:
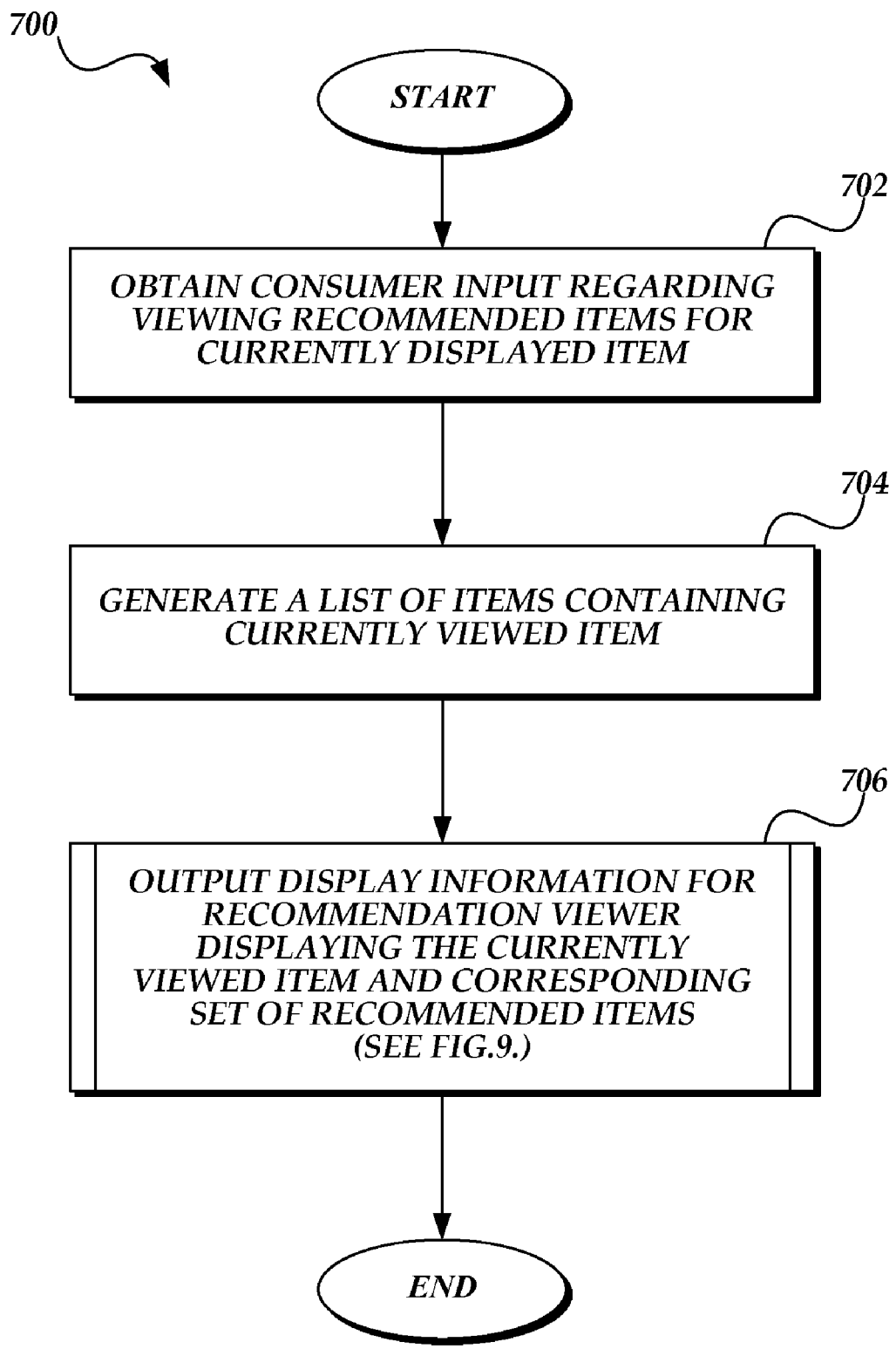
FIG. 7 presents a flow diagram of an illustrative routine for outputting display information for a currently displayed item, such as item 504 shown in FIG. 1A, in a recommendation viewer with a corresponding set of recommended items.

The functionality of the recommendation viewer 602, in conjunction with various consumer actions/directives, will now be described in regard to the flow diagrams of FIGS. 7-9B. Beginning with FIG. 7, FIG. 7 is a flow diagram of an illustrative routine 700 for outputting display information for a currently displayed item, such as item 504 shown in FIG. 1A, in a recommendation viewer 602 with a corresponding set of recommended items.

Beginning at block 702, the recommendation server 216 (or some other hardware or software component of the network shopping service 210) obtains input from the consumer regarding viewing recommended items corresponding to a currently displayed item 504. At block 704, as the item is not displayed as an item on a predetermined list, a temporary list is generated, the temporary list including the currently displayed item 504.

At block 706, a sub-routine (as described below in regard to FIGS. 9A and 9B) is called for providing display information for displaying a recommendation viewer with the temporary list comprising the currently viewed item, as well as interacting with the recommendation viewer. After outputting display information for a recommendation viewer 602 and providing user interaction with the recommendation viewer (as described below) the illustrative routine 700 terminates.

Figure 1B:
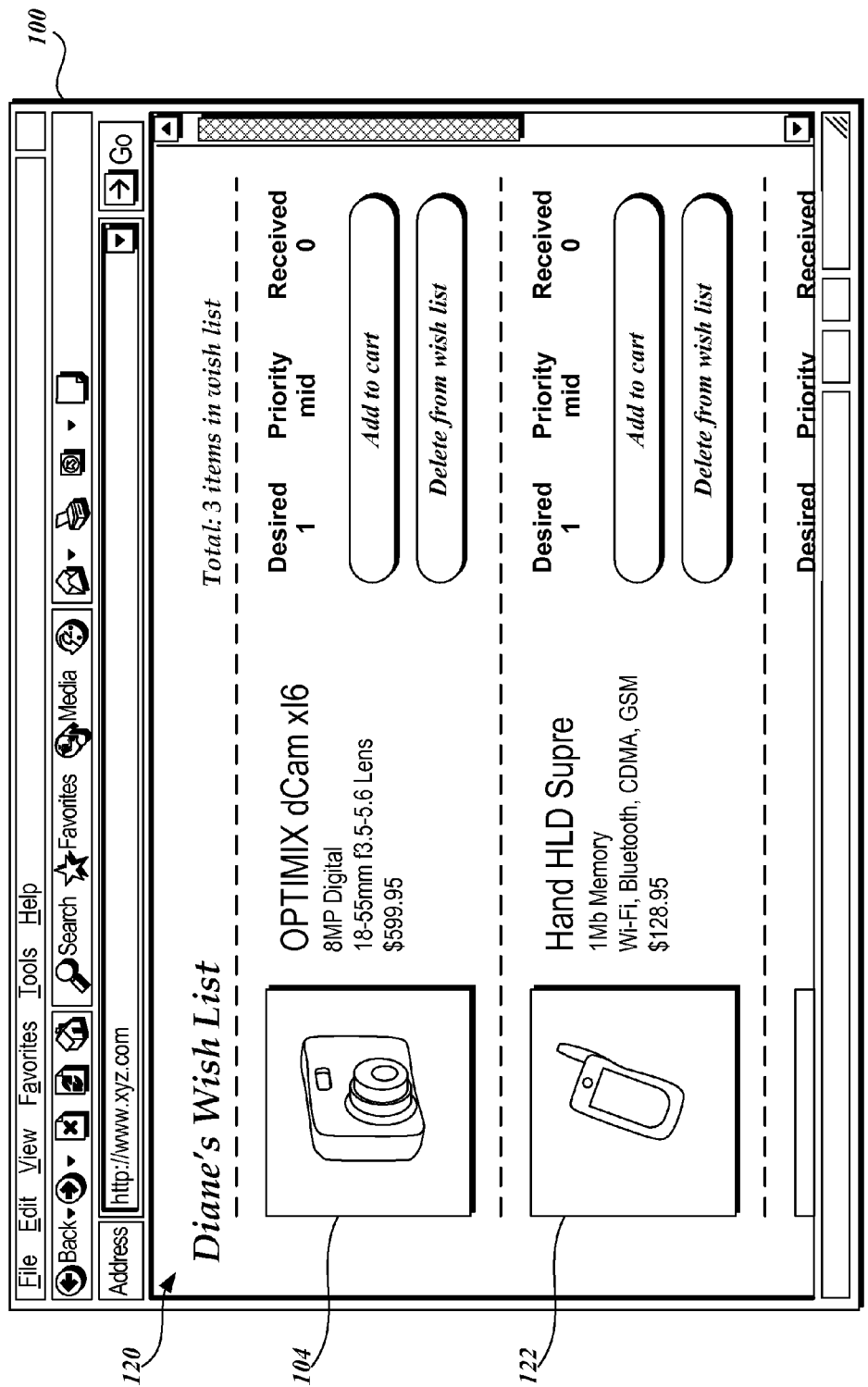
Figure 8:
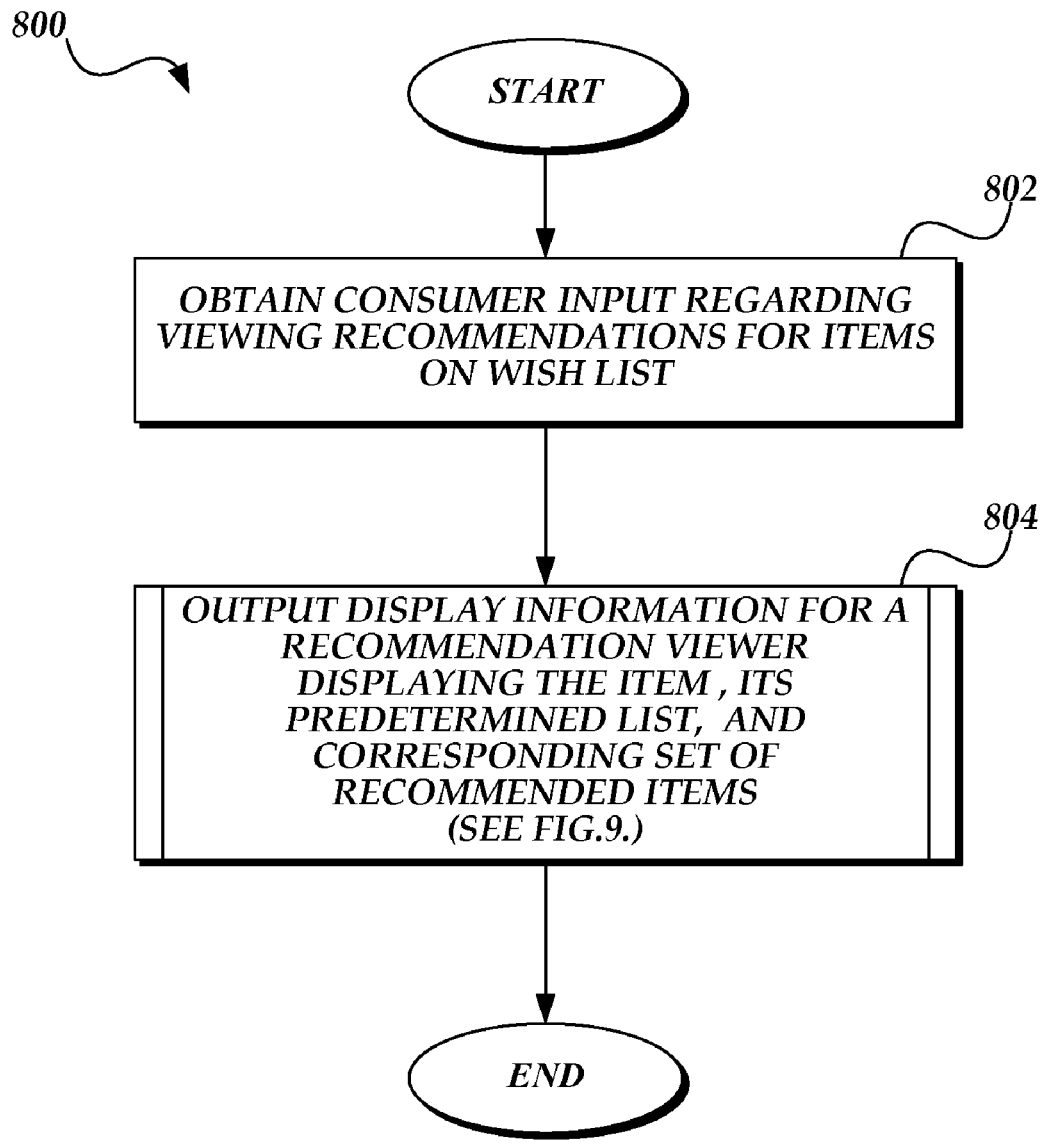
FIG. 8 presents a flow diagram of an illustrative routine for outputting display information for an item on a predetermined list, such as item 504 of the wish list displayed in FIG. 1B, in a recommendation viewer with corresponding sets of recommended items.

Prior to discussing the sub-routine 900 for providing display information for displaying a recommendation viewer 602 with regard to an item on a list, a discussion of viewing recommendations in regard to an item on a predetermined list is presented. More particularly, FIG. 8 presents a flow diagram of an illustrative routine 800 for outputting display information for an item on a predetermined list, such as item 504 of the wish list displayed in FIG. 1B, in a recommendation viewer with corresponding sets of recommended items.

Beginning at block 802, the recommendation server 216 (or some other hardware or software component of the network shopping service 210) obtains input from the consumer regarding viewing recommended items corresponding to an item 504 displayed in conjunction with a predetermined list. At block 804, a sub-routine (as described below in regard to FIGS. 9A and 9B) is called for providing display information for displaying a recommendation viewer with the predetermined list and its elements, as well as interacting with the recommendation viewer 602. After outputting display information for the recommendation viewer 602 and providing user interaction with the recommendation viewer (as described below) the illustrative routine 800 terminates.

Figure 9A:
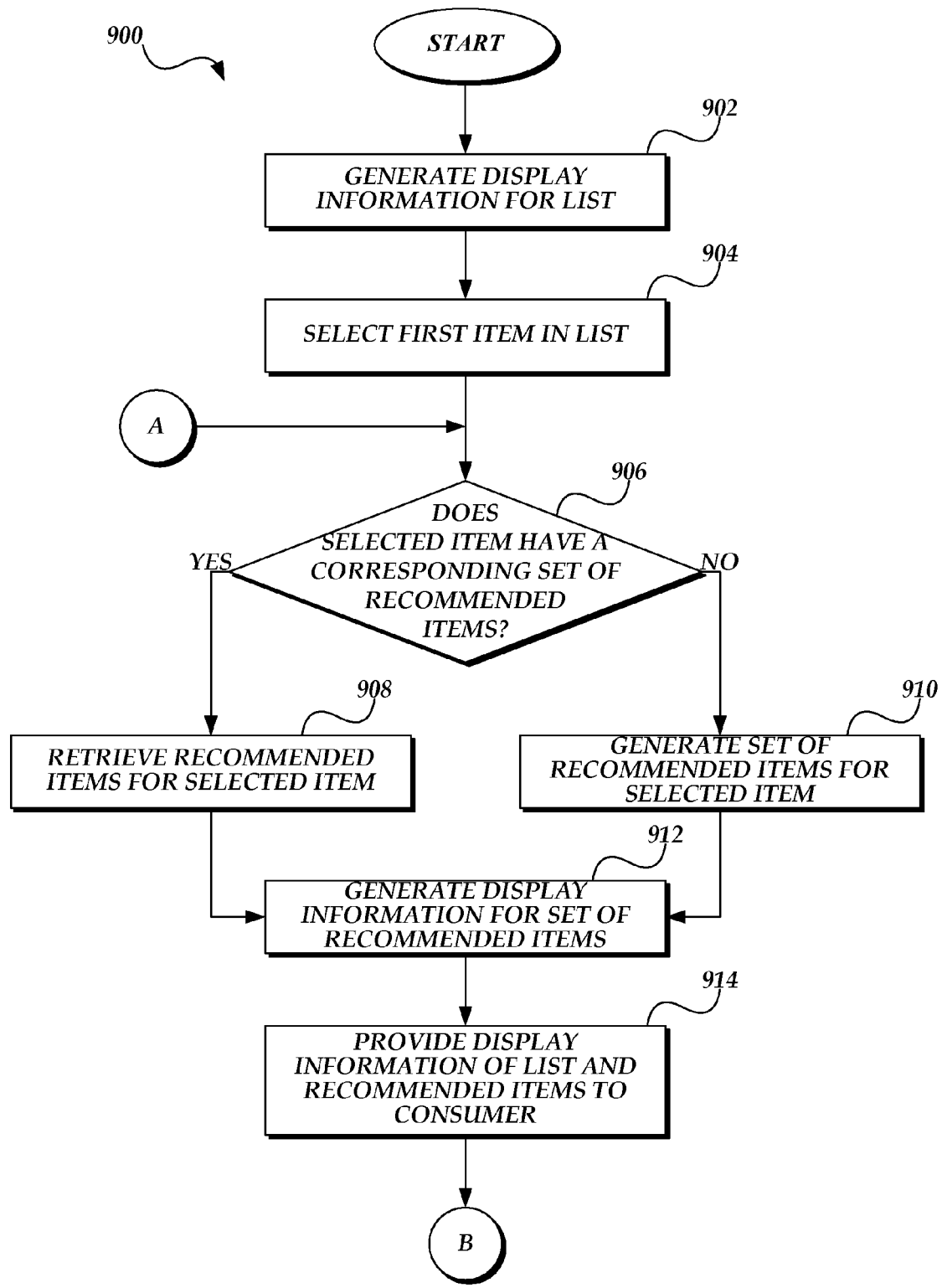
FIGS. 9A and 9B show a flow diagram of an illustrative routine for providing display information for displaying a recommendation viewer with a list of items and corresponding recommended items, as well as interacting with the recommendation viewer.
Figure 9B:
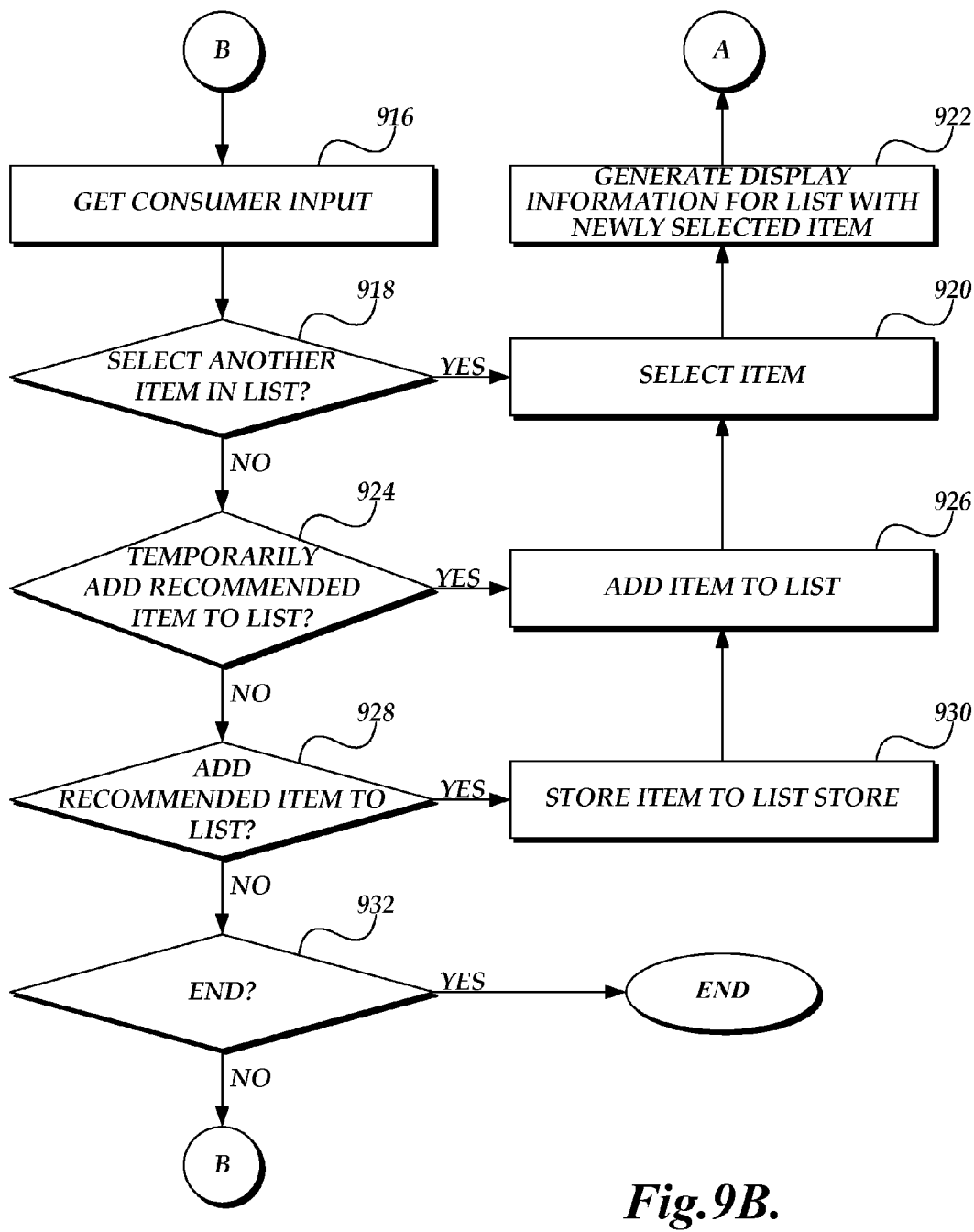

FIGS. 9A and 9B show a flow diagram of an illustrative routine for providing display information for displaying a recommendation viewer with a list of items and corresponding recommended items, as well as interacting with the recommendation viewer. Beginning at block 902 (FIG. 9A), display information for items on the list (whether it is a predetermined list or a temporary list) is generated. For example, with regard to FIG. 6D, assuming that items 504, 606, and 608 are all on the list, display information for displaying these elements in the recommendation viewer 602 is generated.

At block 904, the first item in the list is selected, such that recommendations for this item will first be displayed. Of course, as an alternative, when providing information regarding a recommendation viewer 602 for a predetermined list, the item upon which the consumer triggered display of the recommendation viewer may be selected if it is not the first element of the list.

At decision block 906, a determination is made as to whether the selected item has a corresponding set of recommended items cached on the consumer device. If so, at block 908 the cached set of recommended items corresponding to the selected list item is retrieved. Alternatively, if there is no cached set of recommended items, at block 910 a set of recommended items is generated for the selected item. According to one aspect of the present invention, when generating a set of recommended items, the recommended items are generated specifically for the selected list item and not as a continuation of previous recommendations.

While the above-described steps take advantage of efficiencies with regard to caching sets of recommended items on the consumer device, it should be appreciated that in an alternative embodiment, each time an item is selected, a corresponding set of recommended items may be generated. Moreover, a combination of caching sets of recommended items and re-generated sets of recommended items may be implemented.

At block 912, display information for the set of recommended items corresponding to the selected item is generated. Thereafter, at block 914, the generated display information including the list elements and recommended items for the selected list items are provided to the consumer device.

While the exemplary routine 900 could terminate at this point, especially as display information regarding the recommendation viewer 602 displaying the currently selected item and corresponding set of recommended items is provided. However, to further illustrate subsequent interaction, the exemplary routine 900 described herein proceeds to block 916 (FIG. 9B).

At block 916, the recommendation viewer 602 obtains consumer input regarding the consumer's desired action. At decision block 918, a determination is made as to whether the consumer input was to select another item on the list of items displayed by the recommendation viewer, such as described above in regard to FIGS. 6B-6D. If so, at block 920, the item indicated by the consumer becomes the selected item. At bock 922, display information for the list with its newly selected item is generated. Thereafter, the routine 900 proceeds to decision block 906 to determine whether there is a cached set of recommended items for the selected item, or whether a set of recommended items should be generated. Processing for routine 900 continues as described above.

If the consumer input was not to select another item on the list, at decision block 924 a determination is made as to whether or not the desired action is to temporarily add a recommended item to the list (including adding a recommended item to the list if the list is not a predetermined list such that its items are saved.) If so, the routine 900 proceeds to block 926 where the recommended item is added to the list. While optional, assuming that in temporarily adding the item to the list the consumer also wishes to view corresponding recommended items, at block 920, the newly added item becomes the selected item. As above, at block 922, display information for the list with its newly selected item is generated. Moreover, processing for routine 900 continues as described above.

If the consumer input was not to temporarily add a recommended item to the list, at decision block 928 a determination is made as to whether or not the desired action is to add a recommended item to the list (i.e., add an item to a predetermined list, such as a wish list.) If so, at block 930 the recommended item is added/stored to the predetermined list. Thereafter, at block 926 the recommended item is added to the list of items maintained by the recommendation server 602. Assuming, as above, that adding the item to the list also implies that the consumer wishes to view recommendations for the newly added item, at block 920, the newly added item becomes the selected item. As above, at block 922, display information for the list with its newly add/selected item is generated. Thereafter, processing for routine 900 continues as described above.

If the consumer input was not to add a recommended item to the predetermined list, at decision block 932 a determination is made as to whether the consumer action is to terminate interaction with the recommendation viewer 602. If so, the illustrative routine 900 terminates. However, appreciating that there may be additional consumer actions that may be taken that are not described herein, such actions are processed (not shown) and processing returns to block 916 and continues as described above.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for presenting a set of recommended items corresponding to a first item in a currently viewed list of items, the system comprising:
    a processor;
    a memory; and
    a computer executable component configured to execute via the processor to:
        receive an indication requesting a display of recommended items corresponding to the first item;
        obtain a set of recommended items corresponding to the first item;
        generate display information for displaying the currently viewed list along with the set of recommended items corresponding to the first item, wherein the currently viewed list comprises a plurality of items including the first item;
        provide the display information for displaying the currently viewed list and the set of recommended items corresponding to the first item on a consumer device;
        receive an indication requesting a display of recommended items corresponding to a second item from the currently viewed list;
        generate display information for displaying the currently viewed list and a set of recommended items corresponding to the second item, the currently viewed list including the first item and the second item; and
        provide the display information for displaying the currently viewed list and the set of recommended items corresponding to the second item on the consumer device.

2. The system of claim 1, wherein obtaining a set of recommended items corresponding to the first item comprises generating a set of recommended items corresponding to the first item.

3. The system of claim 1, wherein obtaining a set of recommended items corresponding to the first item comprises determining whether a set of recommended items corresponding to the first item is cached on the consumer device, and if so, obtaining the set of recommended items corresponding to the first item cached on the consumer device.

4. The system of claim 1, wherein the plurality of items corresponds to a predetermined list that is associated with a user and is stored in a data store.

5. The system of claim 4, wherein the predetermined list associated with the user comprises one of a wish list, a gift list, a shopping cart list, and a purchased items list.

6. The system of claim 4, wherein the computer executable component is further configured to:

receive an indication to delete an item in the plurality of items;

delete the indicated item from the plurality of items;

generate display information for displaying the currently viewed list and a set of recommended items corresponding to a selected item, the currently viewed list excluding the deleted indicated item; and provide the display information for displaying the currently viewed list and the set of recommended items corresponding to the selected item on a consumer device.

7. The system of claim 6, wherein the computer executable component is further configured to delete the indicated item from the predetermined list of items associated with the user in a data store storing the predetermined list of items.

8. The system of claim 1, wherein the computer executable component is further configured to:

receive an indication requesting a display of recommended items corresponding to a selected recommended item from the set of recommended items corresponding to the first item;

add the selected recommended item to the currently viewed list;

obtain a set of recommended items corresponding to the selected recommended item;

generate display information for displaying the currently viewed list and the set of recommended items corresponding to the selected recommended item, wherein the currently viewed list comprises a plurality of items including the first item and the selected recommended item; and provide the display information for displaying the currently viewed list and the set of recommended items corresponding to the selected recommended item on a consumer device.

9. The system of claim 8, wherein the plurality of items corresponds to a predetermined list of items stored in a data store, and wherein the computer executable component is further configured to store the selected recommended item with the predetermined list of items in the data store.

10. A system for maintaining recommended items in association with a corresponding list item, the system comprising:

a processor;

a memory; and a computer executable component executing via the processor and configured to:

generate display information for displaying a first item and a first set of recommended items corresponding to the first item; and provide the display information for displaying the first item and the set of recommended items corresponding to the first item on a consumer device;

wherein the computer executable component is further configured to:

receive an indication requesting the display of a second set of recommended items corresponding to a second item of the first set of recommended items;

obtain a second set of recommended items corresponding to the second item;

generate display information for displaying a list of items comprising a plurality of items, including the first and second items, and the second set of recommended items; and provide the display information for displaying the list of items and the second set of recommended items on a consumer device.

11. The system of claim 10, wherein obtaining a second set of recommended items corresponding to the second item comprises generating a second set of recommended items corresponding to the second item.

12. The system of claim 10, wherein obtaining a second set of recommended items corresponding to the second item comprises determining whether a set of recommended items corresponding to the second item is cached on the consumer device, and if so, obtaining the second set of recommended items corresponding to the second item cached on the consumer device.

13. The system of claim 10, wherein the plurality of items corresponds to a predetermined list that is associated with a user and is stored in a data store.

14. The system of claim 13, wherein the predetermined list associated with the user comprises any one of a wish list, a gift list, a shopping cart list, and a purchased items list.

15. The system of claim 13, wherein the computer executable component is further configured to:

select a third item from the list of items;

generate display information for displaying the list of items, including the third item, and a third set of recommended items corresponding to the third item; and provide the display information for displaying the list of items and the third set of recommended items corresponding to the third item on a consumer device.

16. The system of claim 13, wherein the computer executable component is further configured to:

receive an indication requesting a display of recommended items corresponding to a selected recommended item from the first set of recommended items or the second set of recommended items;

add the selected recommended item to the list of items;

obtain a set of recommended items corresponding to the selected recommended item;

generate display information for displaying the list of items, including the selected recommended item, and the set of recommended items corresponding to the selected recommended item; and provide the display information for displaying the list of items and the set of recommended items corresponding to the selected recommended item on a consumer device.

17. The system of claim 16, wherein the computer executable component is further configured to store the selected recommended item with the predetermined list in the data store.

18. The system of claim 13, wherein the computer executable component is further configured to:

receive an indication to delete an item in the list of items;

delete the indicated item from the list of items;

generate display information for displaying the list of items, excluding the deleted indicated item, and a set of recommended items corresponding to a selected item; and provide the display information for displaying the list of items and the set of recommended items corresponding to the selected item on a consumer device.

19. The system of claim 18, wherein the computer executable component is further configured to delete the indicated item from the predetermined list of items associated with the user in a data store storing the predetermined list of items.

20. A computer-implemented method for maintaining and displaying recommended items corresponding to a base list element, the method comprising:

transmitting, by a computer system, display information for displaying a list of items on a consumer device, the list of items including at least one item;

receiving, by the computer system, a consumer instruction to add a first item to the list of items;

obtaining, by the computer system, a set of recommended items corresponding to the first item;

transmitting, by the computer system, display information for displaying the list of items and the set of recommended items corresponding to the first item on the consumer device, the list of items including the first item;

receiving, by the computer system, a selection of a recommended item from the set of recommended items corresponding to the first item;

obtaining, by the computer system, a set of recommended items corresponding to the selected recommended item;

generating, by the computer system, display information for displaying the list of items and a set of recommended items corresponding to the selected recommended item, the list of items including the selected recommended and the first item; and transmitting, by the computer system, display information for displaying the list of items and the set of recommended items corresponding to the selected recommended item on the consumer device.

21. The computer-implemented method of claim 20, wherein obtaining a set of recommended items corresponding to the first item comprises generating a set of recommended items corresponding to the first item.

22. The computer-implemented method of claim 20, wherein obtaining a set of recommended items corresponding to the first item comprises determining whether a set of recommended items corresponding to the first item is cached on the consumer device, and if so, obtaining the set of recommended items corresponding to the first item cached on the consumer device.

23. The computer-implemented method of claim 20, wherein the list of items corresponds to a predetermined list that is associated with a consumer, and wherein the predetermined list is stored in a data store.

24. The computer-implemented method of claim 23, wherein the predetermined list associated with the user comprises any one of a wish list, a gift list, a shopping cart list, and a purchased items list.

25. The computer-implemented method of claim 23 further comprising:
receiving, by the computer system, a selection of a second item from the list of items;
generating, by the computer system, display information for displaying the list of items and a set of recommended items corresponding to the second item, the list of items including the first item and the second item; and
transmitting, by the computer system, the display information for displaying the list of items and the set of recommended items corresponding to the second item on the consumer device.

26. The computer-implemented method of claim 23, wherein the method further comprises storing the selected recommended item with the predetermined list stored in the data store.

27. The computer-implemented method of claim 23, further comprising:
receiving, by the computer system, an indication to delete an item in the list of items;
generating, by the computer system, display information for displaying the list of items and a set of recommended items corresponding to a selected item, the list of items excluding the deleted indicated item; and
transmitting, by the computer system, the display information for displaying the list of items and the set of recommended items corresponding to the selected item on a consumer device.

28. The computer-implemented method of claim 27 further comprising deleting the indicated item from the predetermined list of items associated with the consumer in the data store storing the predetermined list of items.

29. A non-transitory computer-readable medium having a computer-executable component for maintaining recommended items corresponding to a base list item, the computer-executable component comprising:
a user interface component that, in response to execution by a computing system, causes the computing system to perform actions including:
R receiving an instruction from a consumer to add a first item to a displayed list of items that includes at least one additional item;
obtaining a set of recommended items corresponding to the first item;
providing display information for displaying the list of items and the set of recommended items corresponding to the first item for display on a consumer device, the list of items including the first item;
receiving a selection of a second item from the list of items;
generating display information for displaying the list of items and a set of recommended items corresponding to the second item; and
providing the display information for displaying the list of items and the set of recommended items corresponding to the second item on the consumer device.

30. The computer-readable medium of claim 29, wherein obtaining a set of recommended items corresponding to the first item comprises generating a set of recommended items corresponding to the first item.

31. The computer-readable medium of claim 29, wherein obtaining a set of recommended items corresponding to the first item comprises determining whether a set of recommended items corresponding to the first item is cached on the consumer device, and if so, obtaining the set of recommended items corresponding to the first item cached on the consumer device.

32. The computer-readable medium of claim 29, wherein the list of items corresponds to a predetermined list associated with a consumer, and wherein the predetermined list is stored in a data store.

33. The computer-implemented method of claim 32, wherein the predetermined list associated with the user comprises any one of a wish list, a gift list, a shopping cart list, and a purchased items list.

34. The computer-readable medium of claim 32, wherein the actions performed by the computer in response to execution of the user interface component further include:
receiving a selection of a recommended item from a displayed set of recommended items;
obtaining a set of recommended items corresponding to the selected recommended item; and
providing display information for displaying the list of items and the set of recommended items corresponding to the selected recommended item on a consumer device, wherein the list of items includes the first item and the selected recommended item.

35. The computer-readable medium of claim 34, wherein the actions performed by the computer in response to execution of the user interface component further include storing the selected recommended item with the predetermined list stored in the data store.

36. The computer-readable medium of claim 32, wherein the actions performed by the computer in response to execution of the user interface component further include:
receiving an indication to delete an item in the list of items;
deleting the indicated item from the list of items; and
providing display information for displaying the list of items and the set of recommended items corresponding to the selected item on a consumer device, wherein the list of items excludes the deleted indicated item.

37. The computer-readable medium of claim 36, wherein the actions performed by the computer in response to execution of the user interface component further include deleting the indicated item from the predetermined list of items associated with the consumer in the data store storing the predetermined list of items.

\* \* \* \* \*